(12) United States Patent
Yip et al.

(10) Patent No.: US 11,391,303 B2
(45) Date of Patent: Jul. 19, 2022

(54) CABLE DRIVEN HYDRAULIC ROLLING DIAPHRAGM TRANSMISSION AND SERVO-SYSTEM

(71) Applicant: The Regents of the University of California, Oakland, CA (US)

(72) Inventors: Michael Yip, La Jolla, CA (US); Dimitri Schreiber, La Jolla, CA (US); Alex Grant, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 5 days.

(21) Appl. No.: 16/904,468

(22) Filed: Jun. 17, 2020

(65) Prior Publication Data

US 2020/0393025 A1 Dec. 17, 2020

Related U.S. Application Data

(60) Provisional application No. 62/862,150, filed on Jun. 17, 2019.

(51) Int. Cl.
*F15B 15/06* (2006.01)

(52) U.S. Cl.
CPC .................. *F15B 15/06* (2013.01)

(58) Field of Classification Search
CPC ....................................................... F15B 15/06
See application file for complete search history.

(56) References Cited

U.S. PATENT DOCUMENTS

| 2,404,639 | A | * | 7/1946 | Lane | ................... F41A 27/20 92/110 |
| 2,742,100 | A | * | 4/1956 | Rockwell | ............... E02F 3/6454 180/420 |
| 3,033,380 | A | * | 5/1962 | Dorkins | ................... E02F 3/384 212/246 |
| 3,767,160 | A | * | 10/1973 | McCollum | ........... F16K 31/1262 251/61 |

OTHER PUBLICATIONS

J. P. Whitney, M. F. Glisson, E. L. Brockmeyer and J. K. Hodgins, "A Low-Friction Passive Fluid Transmission and Fluid-Tendon Soft Actuator," 2014 IEEE/RSJ International Conference on Intelligent Robots and Systems, Chicago, IL, Sep. 14-18, 2014, pp. 2801-2808, DOI: 10.1109/IROS.2014.6942946.

* cited by examiner

*Primary Examiner* — F Daniel Lopez
(74) *Attorney, Agent, or Firm* — Stuart H. Mayer; Mayer & Williams PC (57) ABSTRACT

A linear to rotary motion converter includes a rigid body having first and second opposing end plates interconnected by at least one rigid crossmember. Each of the end plates is adapted to receive a rolling diaphragm linear actuator to thereby cause linear displacement of the rigid body in an axial direction upon actuation of the rolling diaphragm linear actuators. The linear to rotary motion converter also includes a capstan operably coupled to and located between the end plates such that linear motion of the rigid body caused by actuation of the rolling diaphragm linear actuators is translated to rotational motion of the capstan.

17 Claims, 14 Drawing Sheets

CABLE DRIVEN HYDRAULIC ROLLING DIAPHRAGM TRANSMISSION AND SERVO-SYSTEM

CROSS-REFERENCE TO RELATED APPLICATION

This application claims the benefit of U.S. Provisional Application Ser. No. 62/862,150, filed Jun. 17, 2019, the contents of which are incorporated herein by reference.

FIELD OF THE INVENTION

The invention relates generally to a method and apparatus for transmitting and controlling rotary motion.

BACKGROUND

Rotary links for limited rotation motion (e.g. robot revolute links) ideally are capable of supplying high torque with high bandwidth while having low inertia, friction, mass and backlash, are simple to use and easy to control. Together, these traits enable highly dynamic, accurate, and intrinsically safe joints (e.g. robot systems). These requirements are frequently orthogonal and it is difficult to achieve all of them simultaneously. Transmissions, actuators, and control systems which are capable of achieving these requirements are necessary.

Additionally, specific extreme robot applications place further constraints on these actuator design decisions. For instance, subsea applications must be sealed to prevent water ingress into the actuator. However, seals are typically sources of high friction. Likewise, environments with large magnetic fields preclude the use of standard electric motors (which generate their own magnetic fields) without a transmission to place the motors outside the environment's magnetic field.

SUMMARY

In one aspect, the subject matter described herein provides a linear to rotary motion converter. The linear to rotary motion converter includes a rigid body having first and second opposing end plates interconnected by at least one rigid crossmember. Each of the end plates is adapted to receive a rolling diaphragm linear actuator to thereby cause linear displacement of the rigid body in an axial direction upon actuation of the rolling diaphragm linear actuators. The linear to rotary motion converter also includes a capstan operably coupled to the end plates such that linear motion of the rigid body caused by actuation of the rolling diaphragm linear actuators is translated to rotational motion of the capstan.

In another aspect of the subject matter described herein, the linear to rotary motion converter further includes a first pair of cables mechanically coupling a first of the end plates to the capstan and a second pair of cables mechanically coupling a second of the end plates to the capstan such that each of the cables move tangentially to a circumference of the capstan upon actuation of the rolling diaphragm linear actuators.

In yet another aspect of the subject matter described herein, end portions of a first cable in the first pair of cables and a first cable in the second pair of cables are concentrically or helically wrapped around the capstan.

In another aspect of the subject matter described herein, each of the cables in the first and second pairs of cables extend in the axial direction.

In another aspect of the subject matter described herein, the first and second cables in the first pair of cables are equidistant from a central axis along which the rolling diaphragm linear actuators are displaced. The first and second cables in the second pair of cables are equidistant from the central axis. The first cable in the first pair of cables and the second cable in the first pair of cables are located on opposing sides of the central axis and the first cable in the second pair of cables and the second cable in the second pair of cables is located on opposing sides of the central axis.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
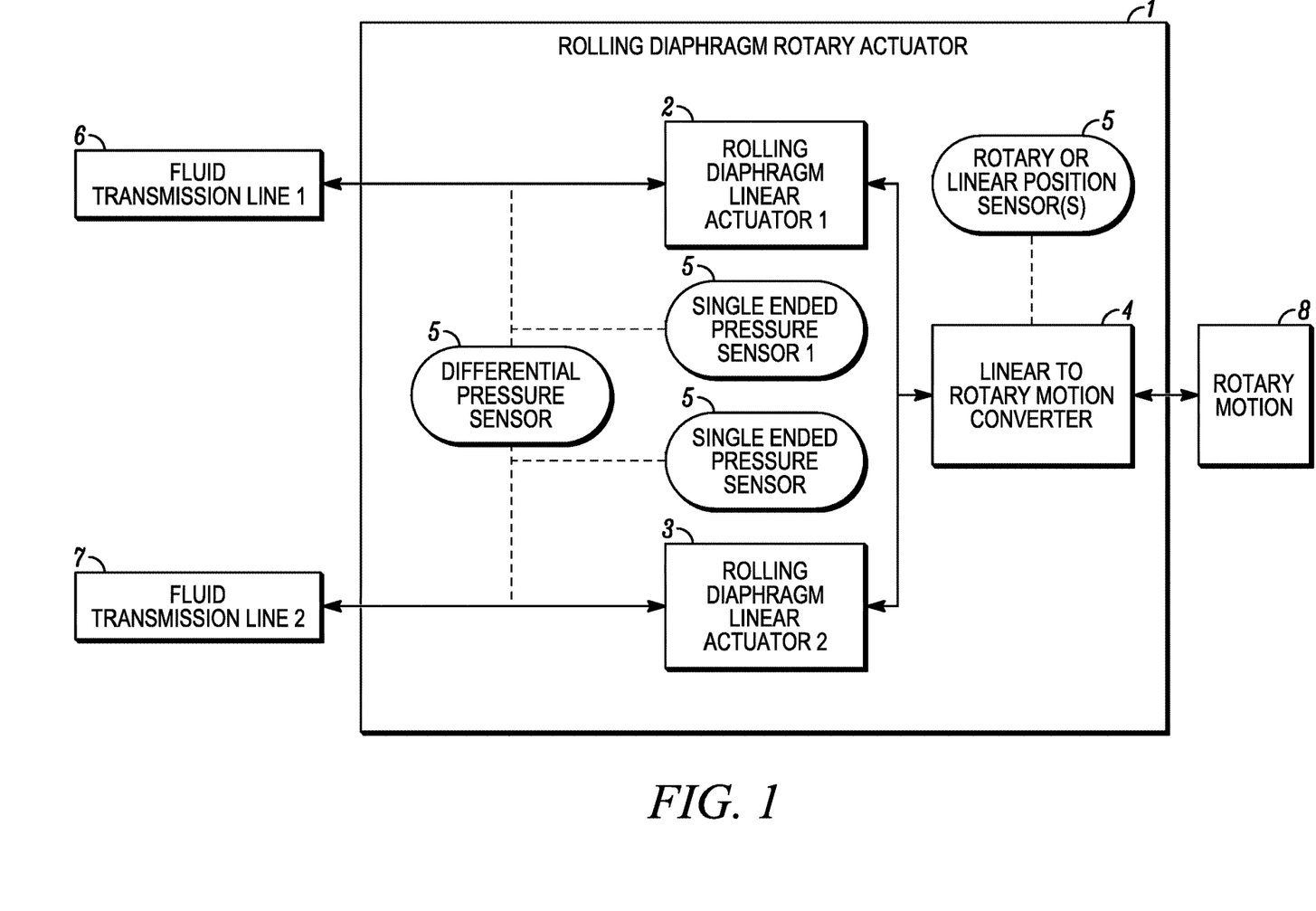
FIG. 1 shows a schematic block diagram of one example of a rotary rolling diaphragm actuator.

FIG. 1 shows a schematic block diagram of one example of a rotary rolling diaphragm actuator 1. The rotary rolling diaphragm actuator 1 serves to convert rotary motion [8] provided, for example, by a motor or a load, to fluid displacement, or vice versa. The rolling diaphragm rotary actuator [1] includes of a pair of rolling diaphragm linear actuators [2,3], and a linear-rotary motion converter [4]. In some embodiments the rotary rolling diaphragm actuator 1 may also include pressure and position sensors [5]. In operation, fluid in transmission lines 6,7 displaced from or to the rolling diaphragm rotary actuator [1] transmits power. The fluid (e.g. air, water, oil) transmission lines [6,7] may be preloaded to increase stiffness and prevent damage to the diaphragms.

The rolling diaphragm rotary actuator [1] may be used in a variety of configurations. For instance, in the case (where the pump and load actuator are both of similar design) of an electro-hydrostatic transmission this actuator may be used as described in Use Case 1 below. Alternatively, the Rotary Rolling Diaphragm Actuator [1] may be used in standard hydraulic drive systems with flow control valves and a supply pump.

Pressure sensors [5] can be connected to both Fluid Transmission Lines [6,7] near both of the Rolling Diaphragm Rotary Actuators [1]. The pressure sensors [5] may be either differential mode to measure across lines or dual single ended. Differential provides superior zero-crossing measurement as the individual sensor calibrations do not need to be performed. This provides pressure measurements at different locations on both Fluid Transmission Lines [6,7], allowing for force estimation. In addition, rotary or linear position and velocity sensors [5] can be used.

Illustrative Use Case 1

Figure 2:
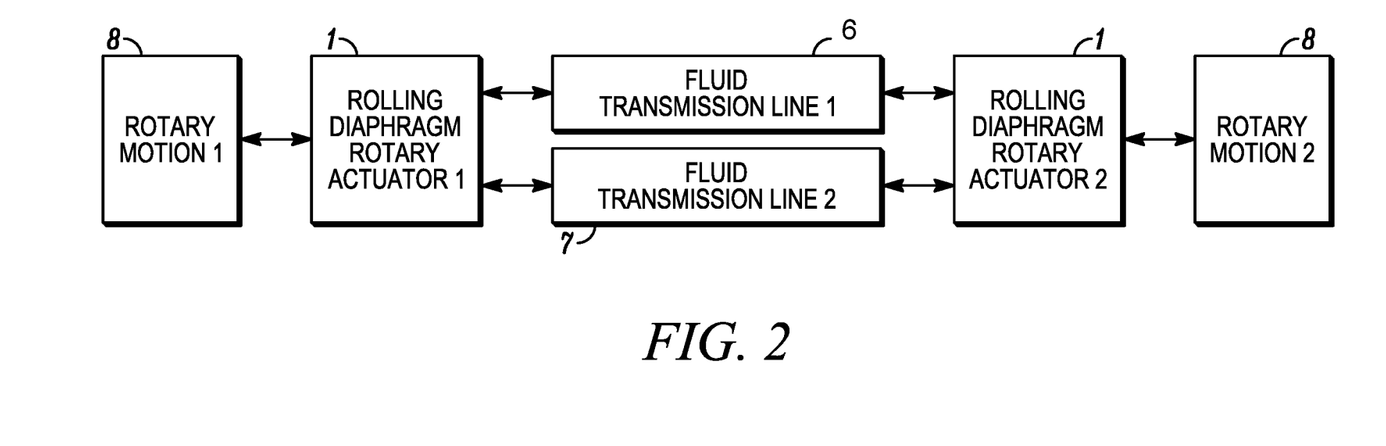
FIG. 2 shows a coupled transmission arrangement that employs two of the rotary diaphragm actuators shown in FIG. 1.

In use case 1 two of the rolling diaphragm rotary actuators 1 shown in FIG. 1 may be configured as shown in FIG. 2 to create a coupled transmission. As shown in FIG. 2, in this arrangement two rolling diaphragm rotary actuators [1] are connected through Fluid Transmission Lines [6, 7] (e.g., hoses or pipes) to form a closed loop and complete transmission. In one particular implementation, a hydraulic-hydraulic configuration may be employed in which both transmission lines are hydraulic. In this implementation liquid passes through the hoses [6,7] to transmit power between the rolling diaphragm rotary actuators [1]. The fluid (e.g., water, oil) transmission lines between the rolling diaphragm linear actuators [1] may be preloaded to increase stiffness and prevent damage to the diaphragms.

Figure 3:
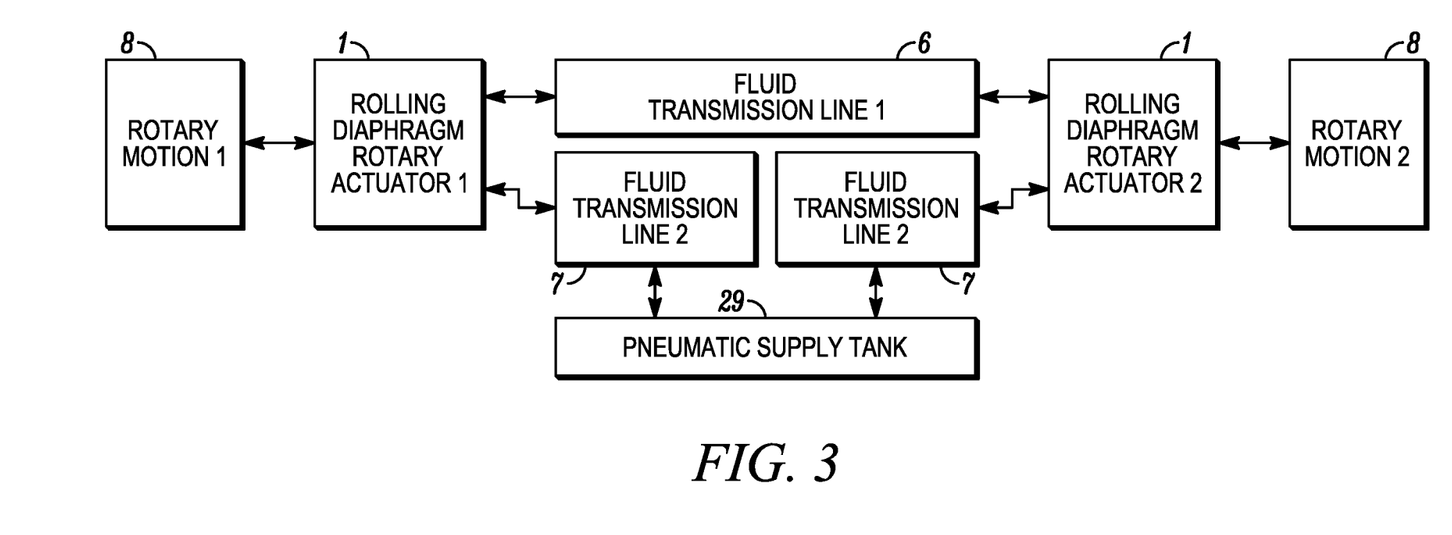
FIG. 3 shows another coupled transmission arrangement that employs two of the rotary diaphragm actuators shown in FIG. 1.

In an alternative configuration (a Fluid-Pneumatic configuration) illustrated in FIG. 3, fluid passes through one of the hoses [6], while the pneumatic rolling diaphragm linear actuators connected to the fluid transmission lines 2 [7] and pneumatic supply tank [29] act as constant force springs preloading the fluid transmission line 1 [6] and allowing bidirectional motion and force transmission between the rolling diaphragm rotary actuators [1] using the fluid transmission line 1 [6]. In this case one of the transmission lines may be hydraulic and one may be pneumatic. In this configuration, the pneumatic linear rolling diaphragm actuator within each rolling diaphragm rotary actuator [1] 2 preloads the hydraulic linear rolling diaphragm actuator 1, allowing for bidirectional motion. The preload prevents negative pressure within the hydraulic line which would both collapse the diaphragm, decrease stiffness, and boil the fluid. In some cases both transmission lines may be pneumatic where the volume of the lines differ substantially; In the case of a large air volume, the pressure within the pneumatic linear rolling diaphragm actuator connected to fluid transmission line 2 [7] and the pneumatic supply tank [29] remains approximately constant and the pneumatic linear rolling diaphragm actuator functions as a constant force spring.

Figure 4:
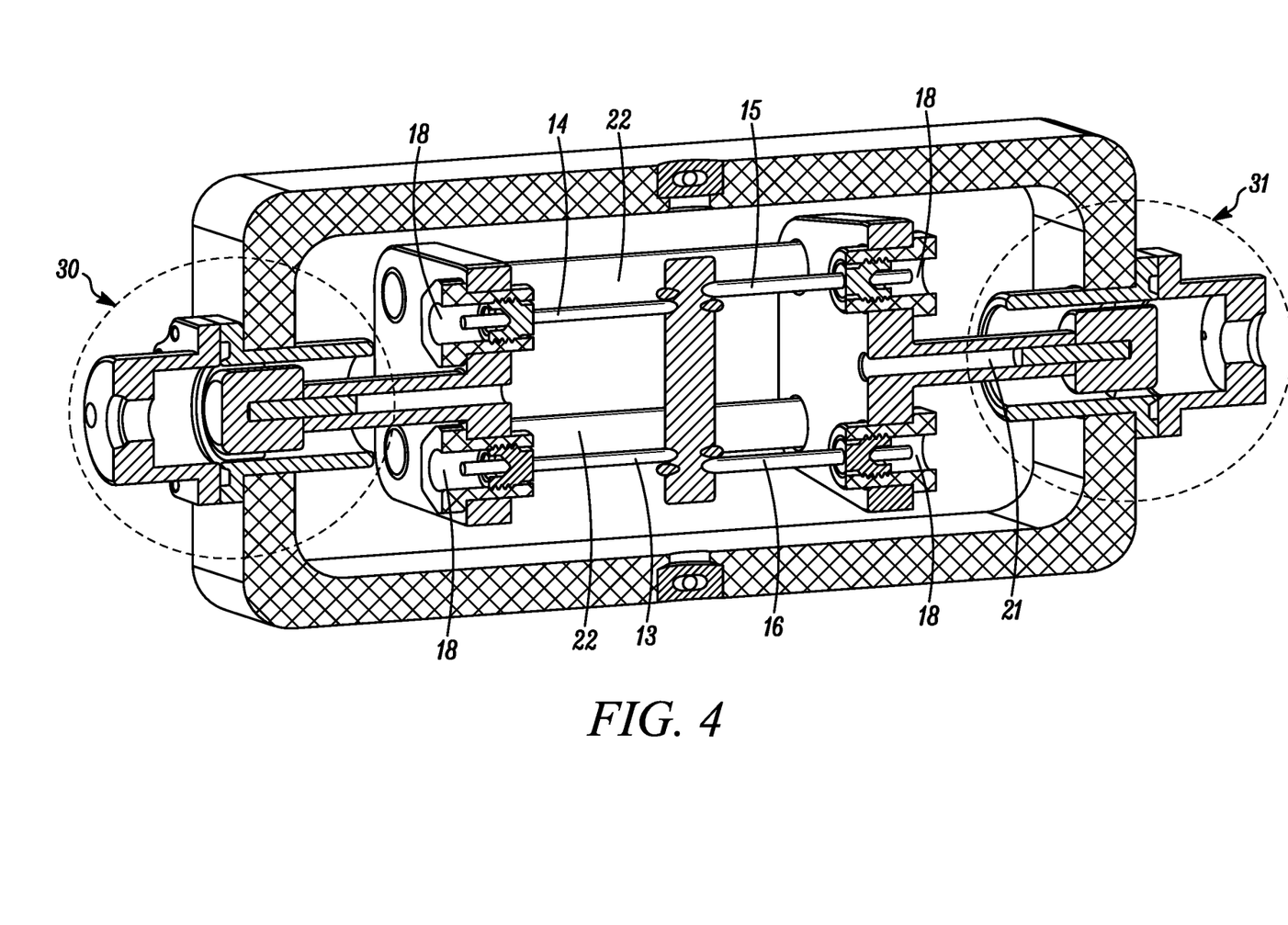
FIG. 4 shows a cross-sectional view of a balanced example of the linear to rotary motion converter shown in FIG. 1.
Figure 5:
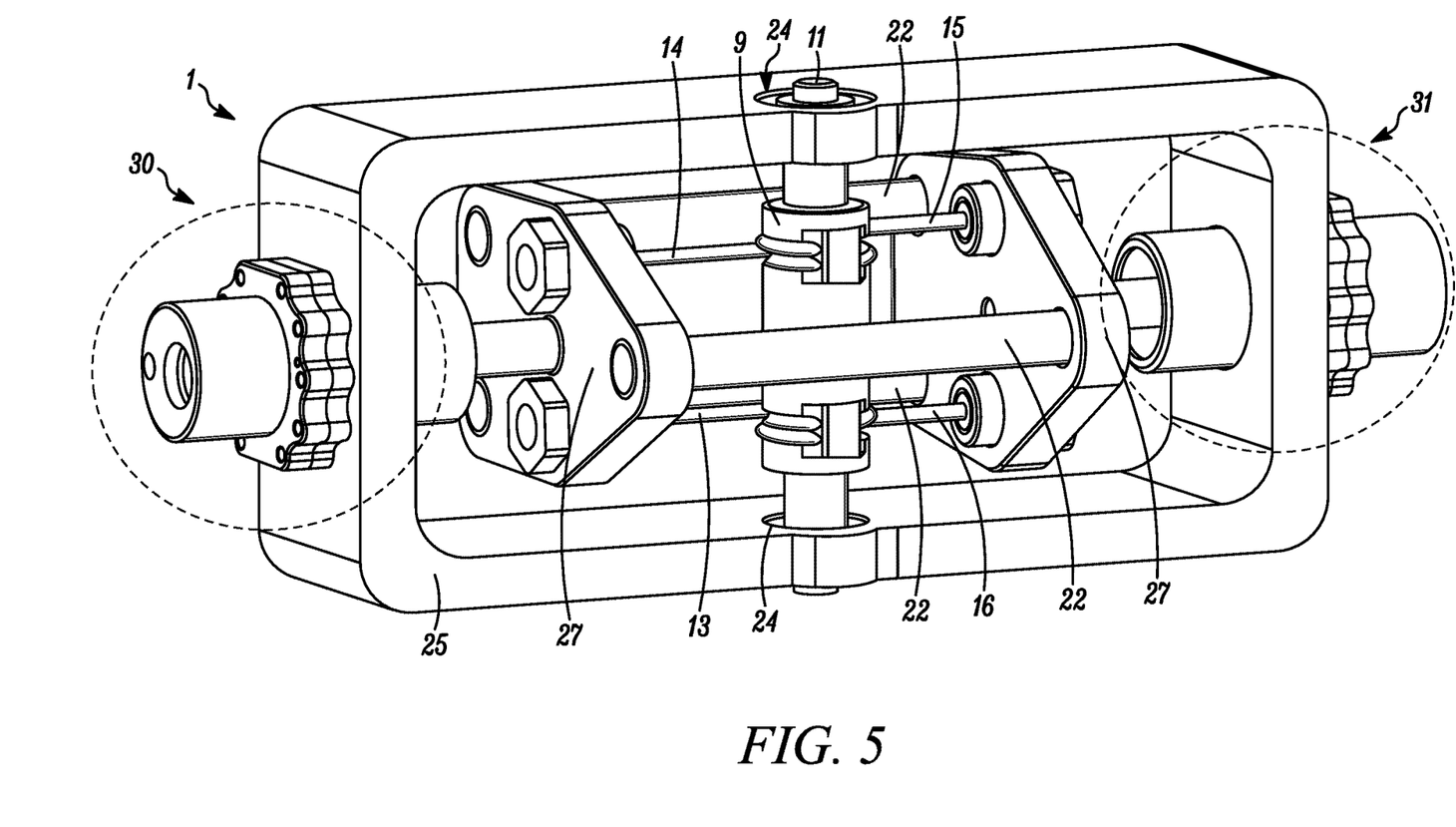
FIG. 5 shows a full view of the linear to rotary motion converter shown in FIG. 4.
Figure 6:
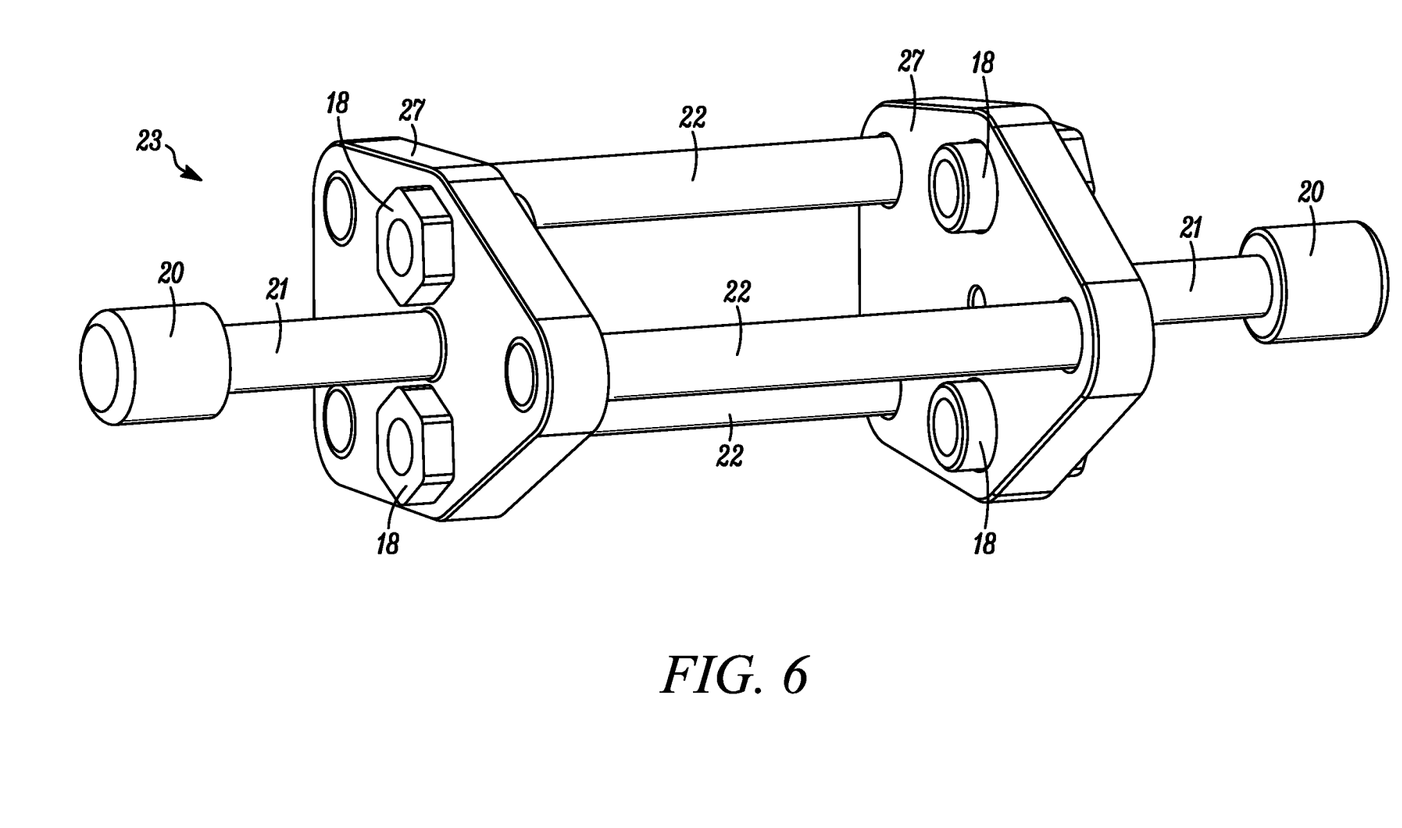
FIG. 6 shows the cable linear rigid body employed in the linear to rotary motion converter shown in FIGS. 4 and 5.
Figure 7:
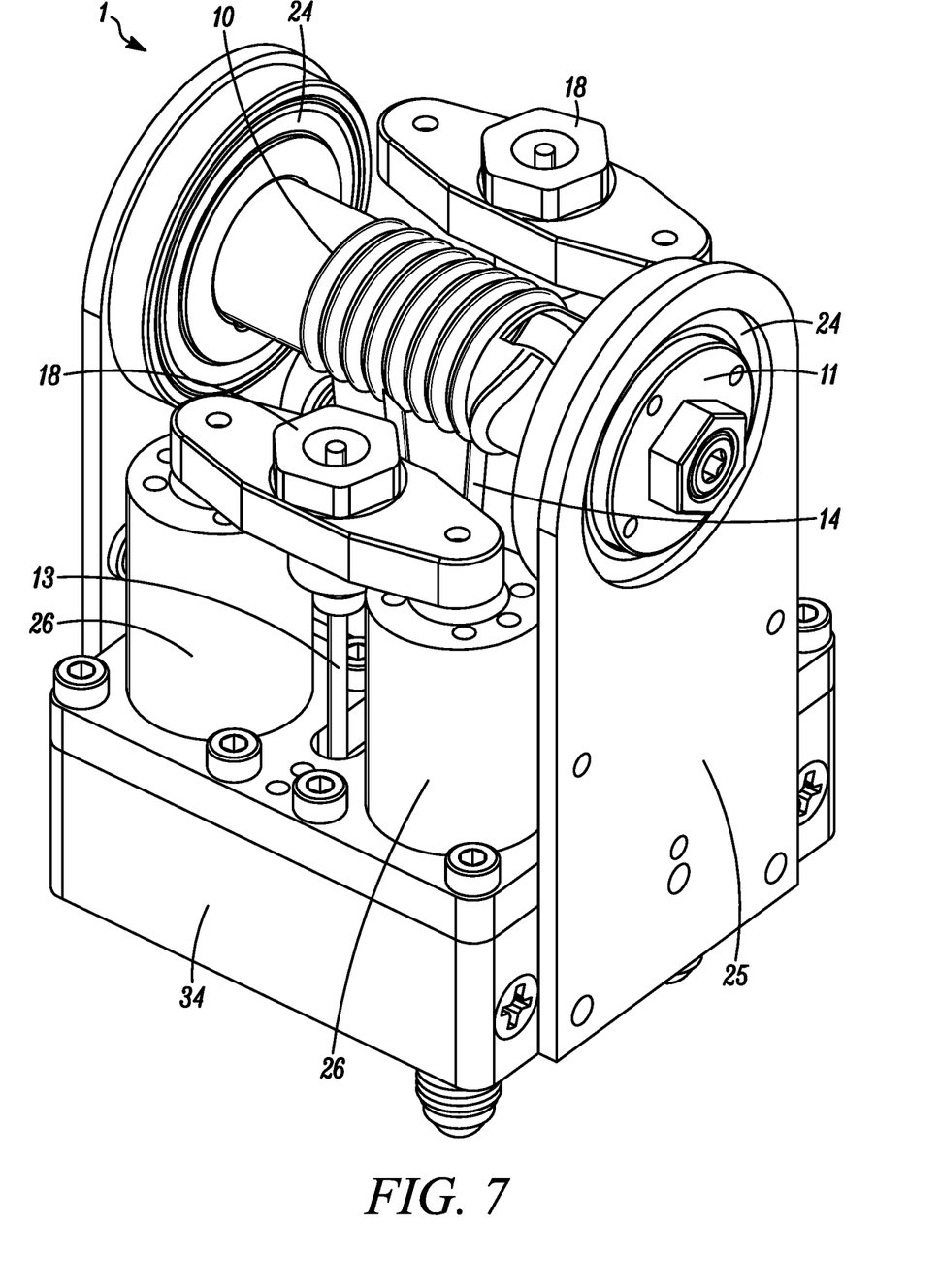
FIG. 7 shows an alternative embodiment of the linear and rotary motion converter shown in FIG. 1.
Figure 10:
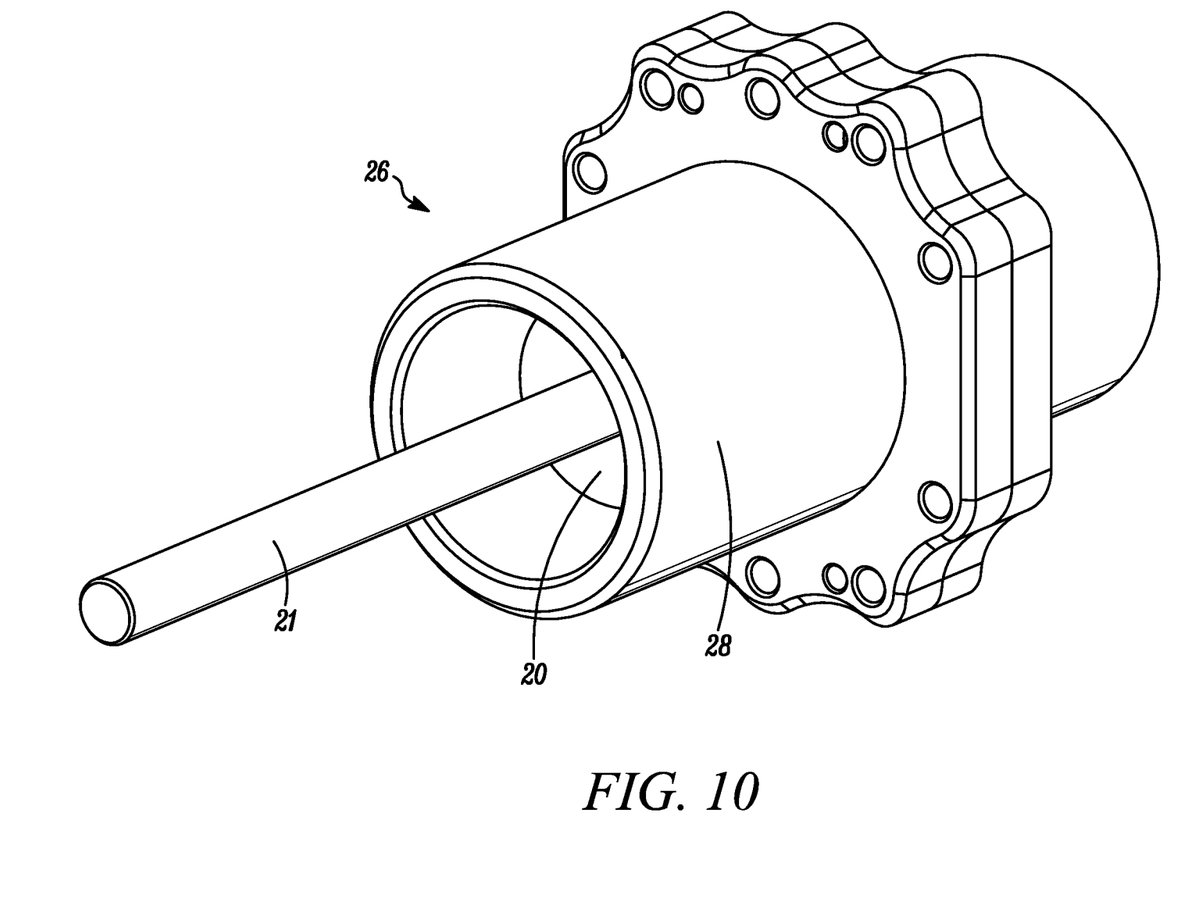
FIGS. 10 and 11 show one example of the rolling diaphragm cylinder employed in the linear and rotary motion converter shown in FIG. 7.
Figure 11:
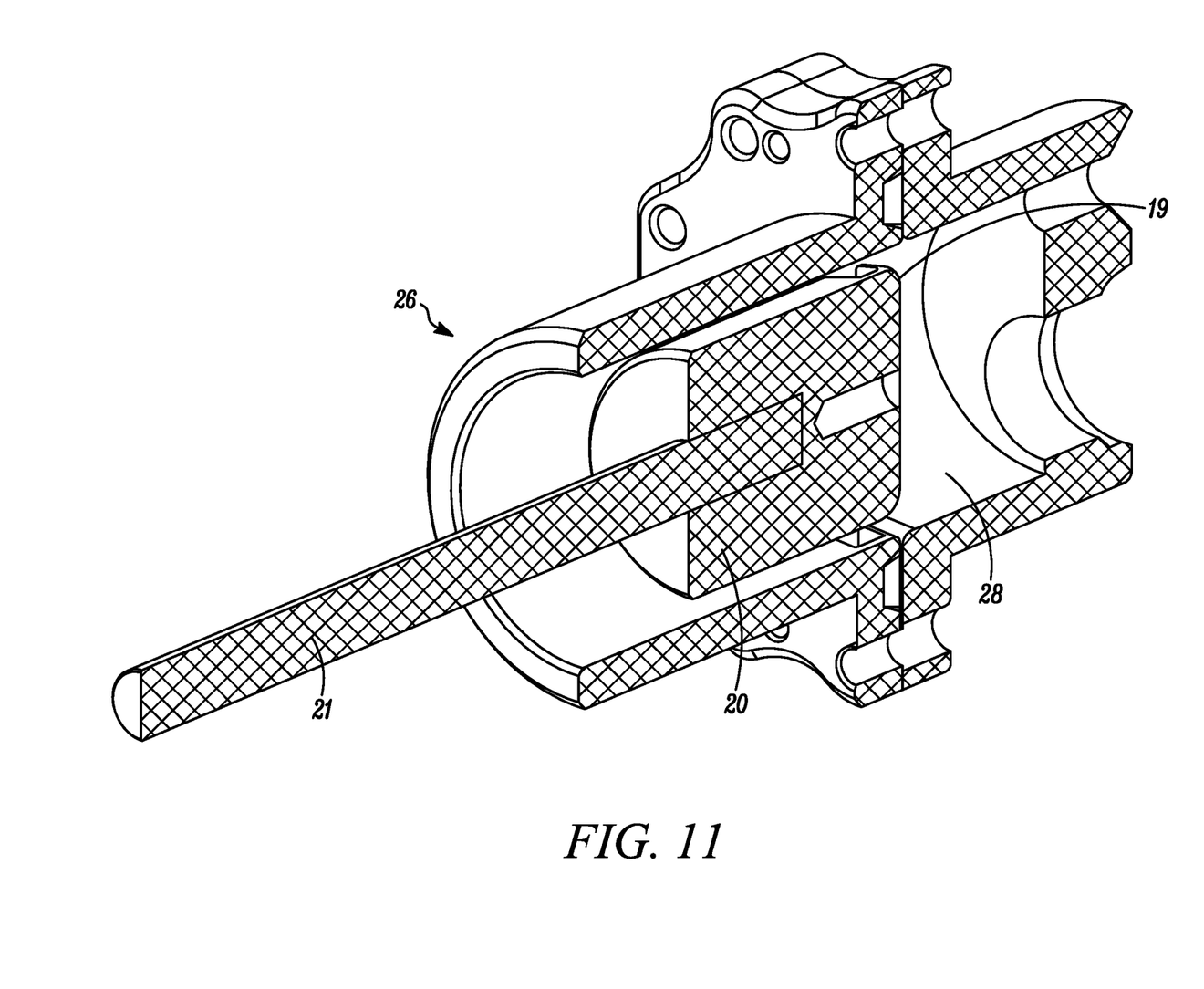

Linear and Rotary Motion Converter Mechanism Using Balanced Cable Actuated Design FIGS. 4-6 show one particular embodiment of the Linear and Rotary motion converter [4] shown in FIG. 1, combined with the linear rolling diaphragm actuators 2, 3, also described in FIG. 1. This example may be used, for example, for limited rotation with low friction while supporting high torsional loads. In this implementation, each rolling diaphragm linear actuator [2,3] is comprised of a single rolling diaphragm cylinder [26]. The rolling diaphragm cylinder [26] includes a rolling diaphragm [19], a piston[20], a piston rod [21], and a diaphragm cylinder housing[28]. One example of the rolling diaphragm cylinder will be described below in FIGS. 10-11. As shown, pretensioned cables [13, 14,15,16] terminate on both a concentric cable capstan [9] and a closed loop cable linear rigid body [23] (comprising end plates [27], guide rods [22], pistonrods [21], pistons[20], and cable tensioner units [18]) such that minimal loads are applied to the system's rotary bearings [24] and the pistonrods[21] are supported without auxiliary bushings or bearings.

In the hydraulic-hydraulic configuration, when fluid enters the left rolling diaphragm linear actuator [30], an equal amount leaves the right rolling diaphragm linear actuator [31]. The function of the rotary rolling diaphragm actuator is identical in the hydraulic-pneumatic configuration, where the air in the preloaded opposing cylinder [3] compresses and leaves the cylinder.

The cable linear rigid body [23] comprises cross members [22] under compression loading, which are connected to end plates [27]. The cable linear rigid body [23] may comprise several independent components or a single piece. The pistons[20] for the rolling diaphragm linear actuators [30, 31] are rigidly connected to the cable linear rigid body [23]. Together, when coupled through the cable linear rigid body [23], the two rolling diaphragm linear actuators [30, 31] can be viewed as a single double acting cylinder. A structure or frame [25] holds together the system comprising the rolling diaphragm linear actuators [30, 31] and the linear-rotary converter [4]

Figure 8:
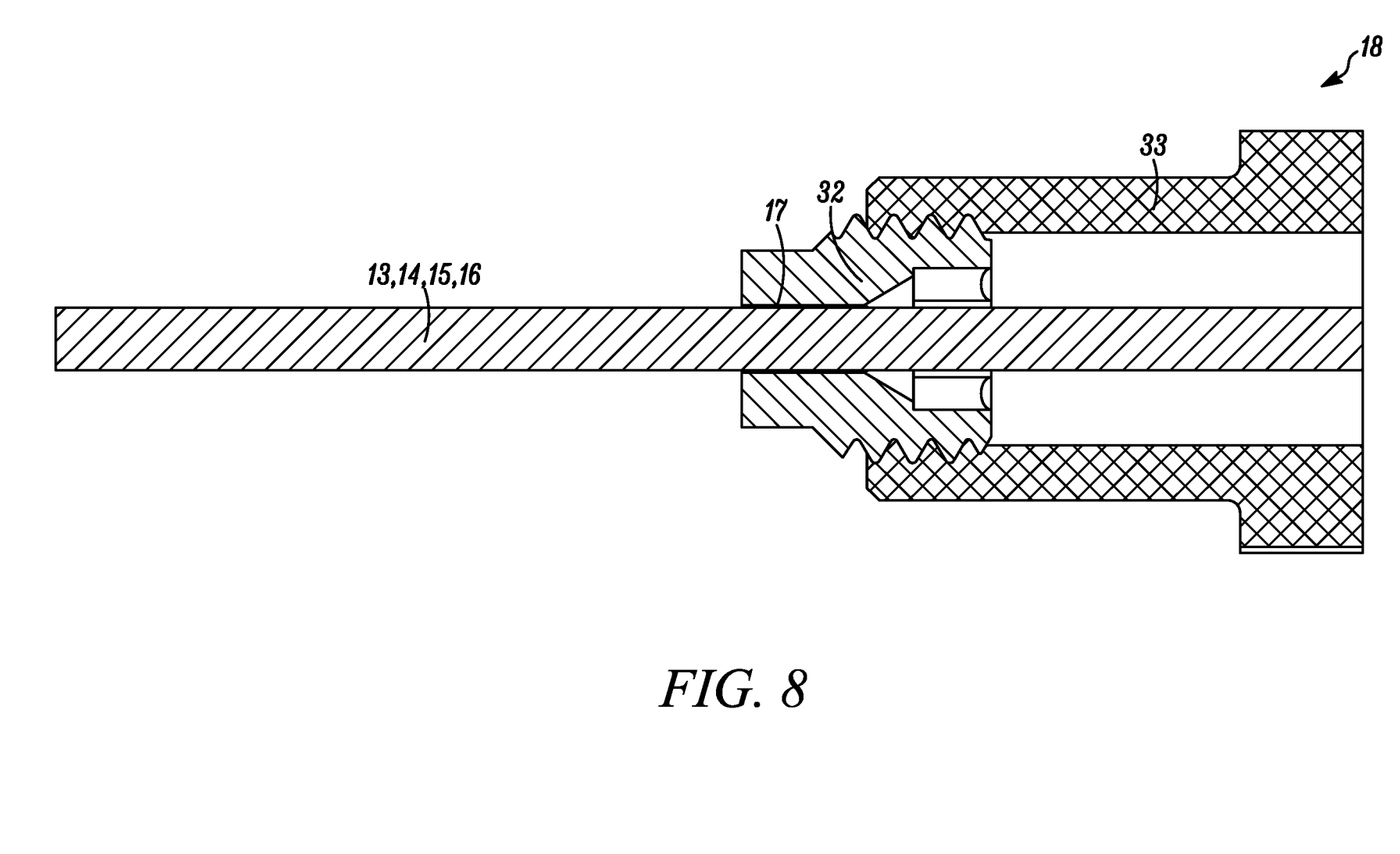
FIG. 8 shows the cable tensioner unit employed in the linear and rotary motion converter shown in FIG. 7.

The cable tensioner unit [18] (e.g. a cable terminated in through a hollow screw and tensioned via a nut, illustrated in FIG. 8), cable linear rigid body [23], and attached cables [13,14,15,16] translate linearly to the right. The cables [13,14,15,16] terminate on the linear rigid body [23] and the capstan [9]. Cables [13] and [14] are equidistant from the central axis of the rolling diaphragm actuators [30, 31] along which they apply force (e.g. balanced forces to remove torques). Likewise, cables [15] and [16] are also equidistant from the central axis of rolling diaphragm actuators [30,31]. However, as shown, cable [13] and cable [14] are located at different distances from the central axis than cable [15] and cable [16].

The cables can be wrapped around the capstan [9] in either a concentric (as shown in the FIGS. 4, 5, 6) or a helical manner. A concentric wrap allows for constant preload and the helical wrap allows for multiple rotations. The cables move tangentially to the capstan's [9] surface upon motion of the rolling diaphragm linear actuators. This motion results in an increased cable wrap for cables [13,14] and decreased cable wrap for cables [15,16], with the rotary output shaft [11] rotating clockwise when viewed from the top view in FIG. 5.

The cables [13,14,15,16] terminate on the rigid body end plates [27] of the cable linear rigid body [23] via one or more tensioning mechanisms, defined above. In this example four independent tensioners are used. In this way independent tensioning of the four cables [13,14,15,16] may be performed, enabling tuning of the structure to accommodate manufacturing tolerances. The cables terminating on each end plate 27 may have their own dedicated tensioning mechanism (as shown in this embodiment) or they may share tensioners to automatically equalize loads and/or provide simpler assembly. Alternatively, in some implementations a single tensioner may apply tension to all four cables. In yet another alternative, the cables [13,14,15,16] may have the tensioning mechanism placed on the capstan [9], or on any combination of capstan [9] and the cable linear rigid body [23].

The rotary output shaft [11] extending from the capstan 9 is supported by a bearing [24] mounted to the frame [25].

The embodiment of the linear and rotary motion converter [4] described above in connection with FIGS. 4-6 provides a number of advantages. For instance, it provides a balanced cable drive using pretensioned cables for converting between linear and rotary motion. This allows for negligible bearing loads due to system actuation, thereby allowing the use of smaller bearings and reduced friction. Moreover, this design does not cause direct loading of the rotary bearings as all forces are directly tangent to the surface of the pulley and canceled by opposing cables if not tangent. Off axis loads due to cable tension are internal to the cable support structure. The cables pairs [13,14] and [15,16] cancel vertical loads. The cable pairs [14, 15] and [13, 16] support horizontal loads. All cables are pretensioned to equal loads greater than the maximal force applied by the rolling diaphragm cylinders to prevent slack. Further, the rolling diaphragm force output is tangent to the rotary pulley, decreasing system loads and allowing the use of lighter duty components, thereby reducing cost, size, and friction while supporting larger input/output torques.

Another advantage of the embodiment of the Linear and Rotary motion converter [4] described above in connection with FIGS. 4-6 is that it is self-supporting. The four cables resist axial and torsional forces not in line with the rolling diaphragm linear actuator's translation direction. This removes the need for support bushings. In addition, idler pulleys or bushing guides are not required, decreasing frictional losses and component count.

Yet another advantage is Increased efficiency due to the cable drive in which there are no sliding contacts, which is in contrast to rack and pinion designs. Another advantage is a higher load rating natively, in contrast to a friction/timing belt drive. This embodiment does not require teeth, which can "skip" or "slip" when the cable is fully terminated on the central capstan.

Furthermore, this embodiment allows for cable pretensioning and prevents decabling in the case of a loss of cylinder pressure, allowing for easier assembly and maintenance. In contrast, non-closed loop drives suffer from decabling (cable drive)/decogging (belt drive) unless special precautions are taken. This enables easier assembly and prevents decabling in case of lost pressure.

Linear and Rotary Motion Converter Mechanism for Flexible Packaging and High Load FIGS. 7, 8, 12, 13 and 14 show another embodiment of the linear and rotary motion converter [4] shown in FIG. 1, combined with the linear rolling diaphragm actuators [2,3] also described in FIG. 1. This example may be used, for example, for applications which require flexible packaging, while supporting high torsional loads. In this implementation, each rolling diaphragm linear actuator [30, 31] is composed of two rolling diaphragm cylinders, with two pistons[20] used in parallel per rolling diaphragm linear actuator instead of a single piston per the rolling diaphragm linear actuators [30,31] shown in the previous embodiment. Each rolling diaphragm cylinder [26] includes a rolling diaphragm [19], a piston [20], a piston rod [21], a diaphragm cylinder housing[28], and a cross member [22].

Figure 12:
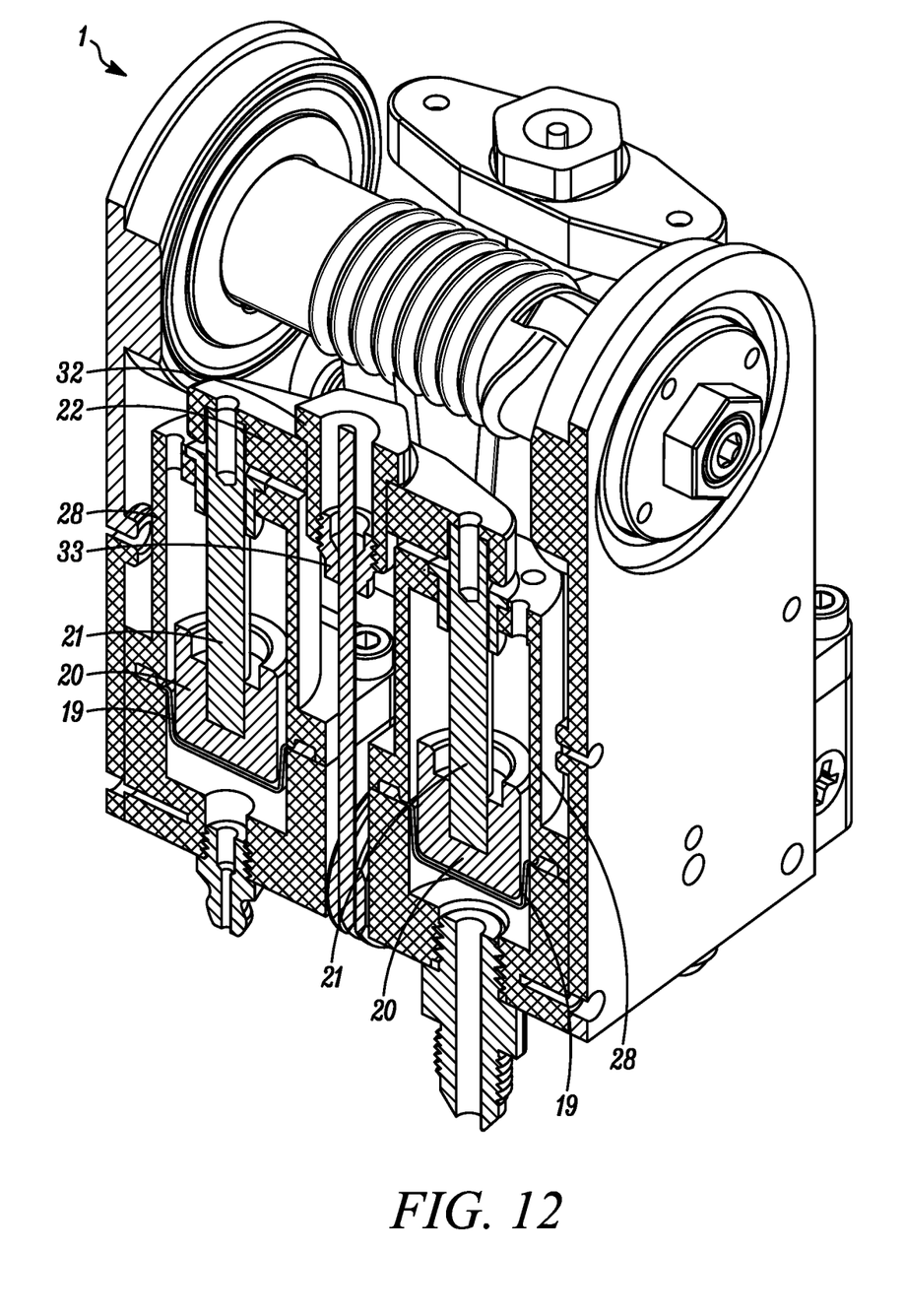
FIG. 12 shows a cross-sectional view of the linear and rotary motion converter shown in FIG. 7.

The total surface area to which the fluid is applying force can be increased by changing the size of a single piston or having multiple pistons in parallel. The use of multiple pistons can allow for different packaging considerations. As shown, the base [34] may contain flow channels that distribute the fluid to each of the parallel pistons. Using multiple pistons also allows different possibilities for self-balancing the forces that the diaphragm sees. Here the cable tensioner unit [18] is located between the pistons to cancel the linear forces in two of the three directions The cables [13, 15] wrap around a helical cable capstan [10] and is terminated in two locations. A structure [25] is used to house the bearings that support the capstan spool. FIG. 12 shows the rolling diaphragm linear actuator 1 [30] (comprising two pistons in parallel) the attachment method and tensioning system. The two parallel pistons [20] and the piston rods [21] are linked together through a crossarm [22]. The crossarm [22] then connects to the cable through a tensioning system [32] or a hardmount. This is described similarly in previous paragraphs.

Figure 13:
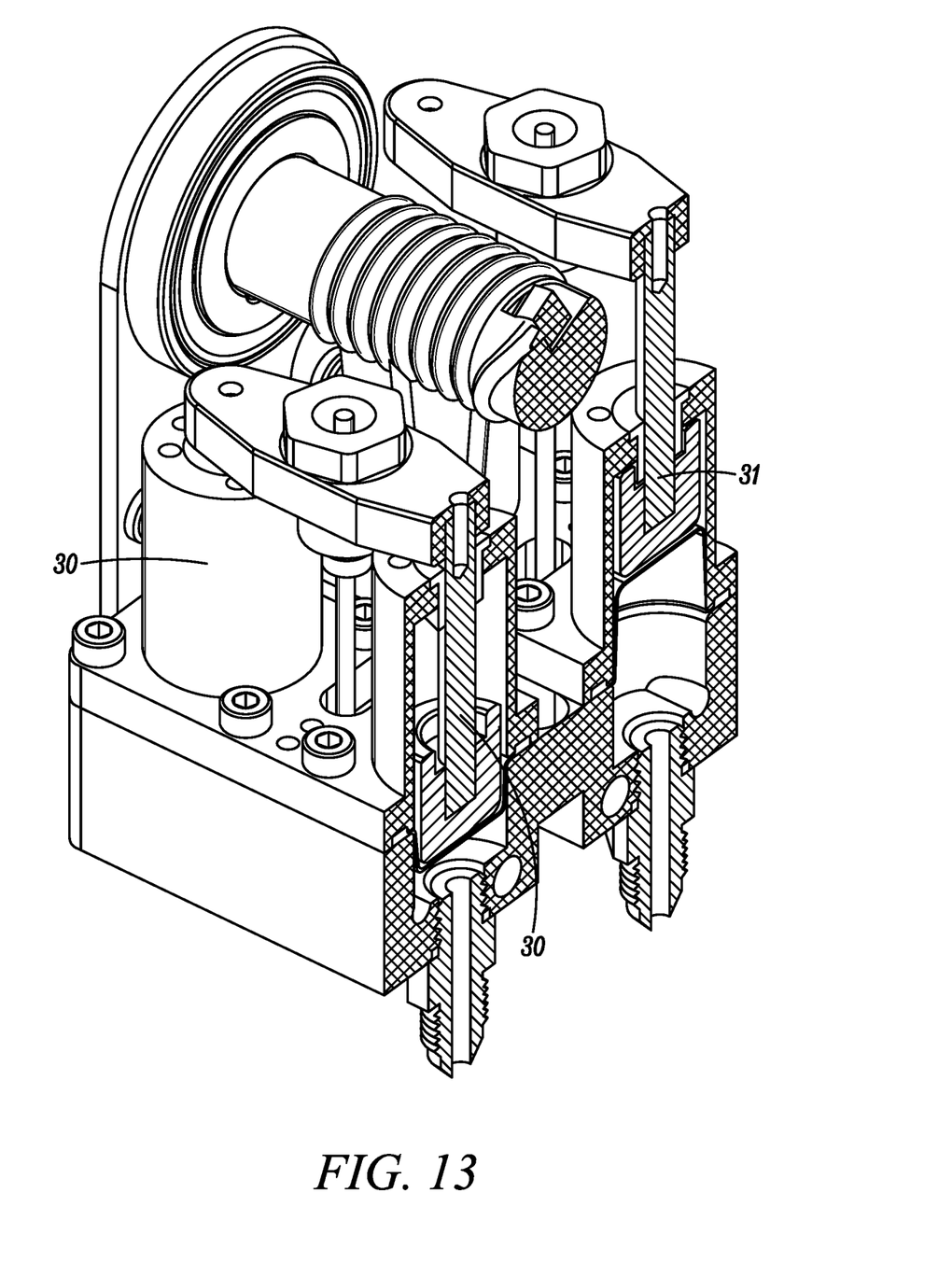
FIG. 13 shows another cross-sectional view of the linear and rotary motion converter shown in FIG. 7.
Figure 14:
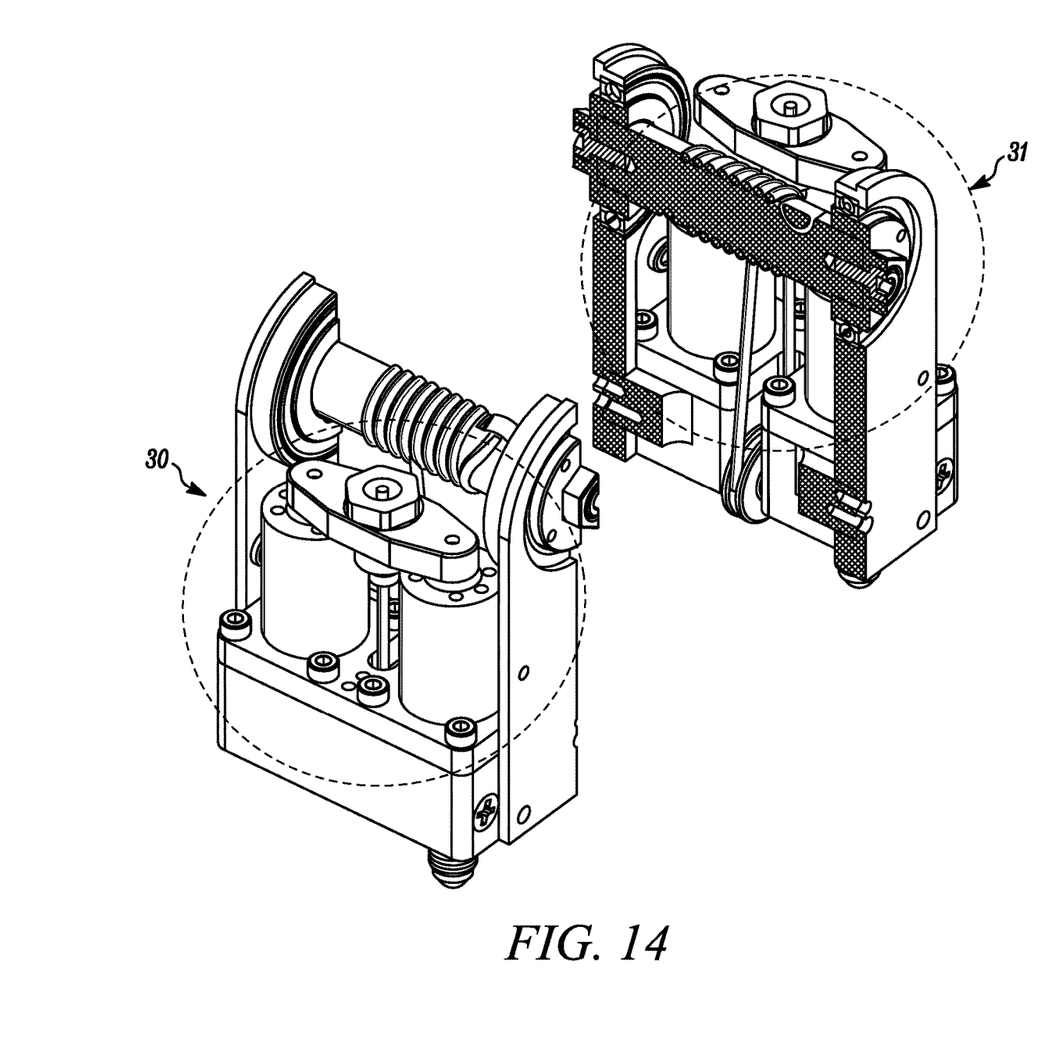
FIG. 14 shows an exploded view of the linear and rotary motion converter shown in FIG. 7.

FIGS. 13 and 14 highlight this implementation of the rolling diaphragm rotary actuator[1] as two mirrored halves each composed of a rolling diaphragm linear actuator [30, 31]. The rolling diaphragm linear actuator 1[30] shown in FIG. 12 is also seen here in the lower position. After going through the cable and attaching to the capstan there is a mirror image of this setup (rolling diaphragm linear actuator 2[31], and rolling diaphragm linear actuator 2[31] that create the push-push needed for a positive pressure fluid system.

Figure 15:
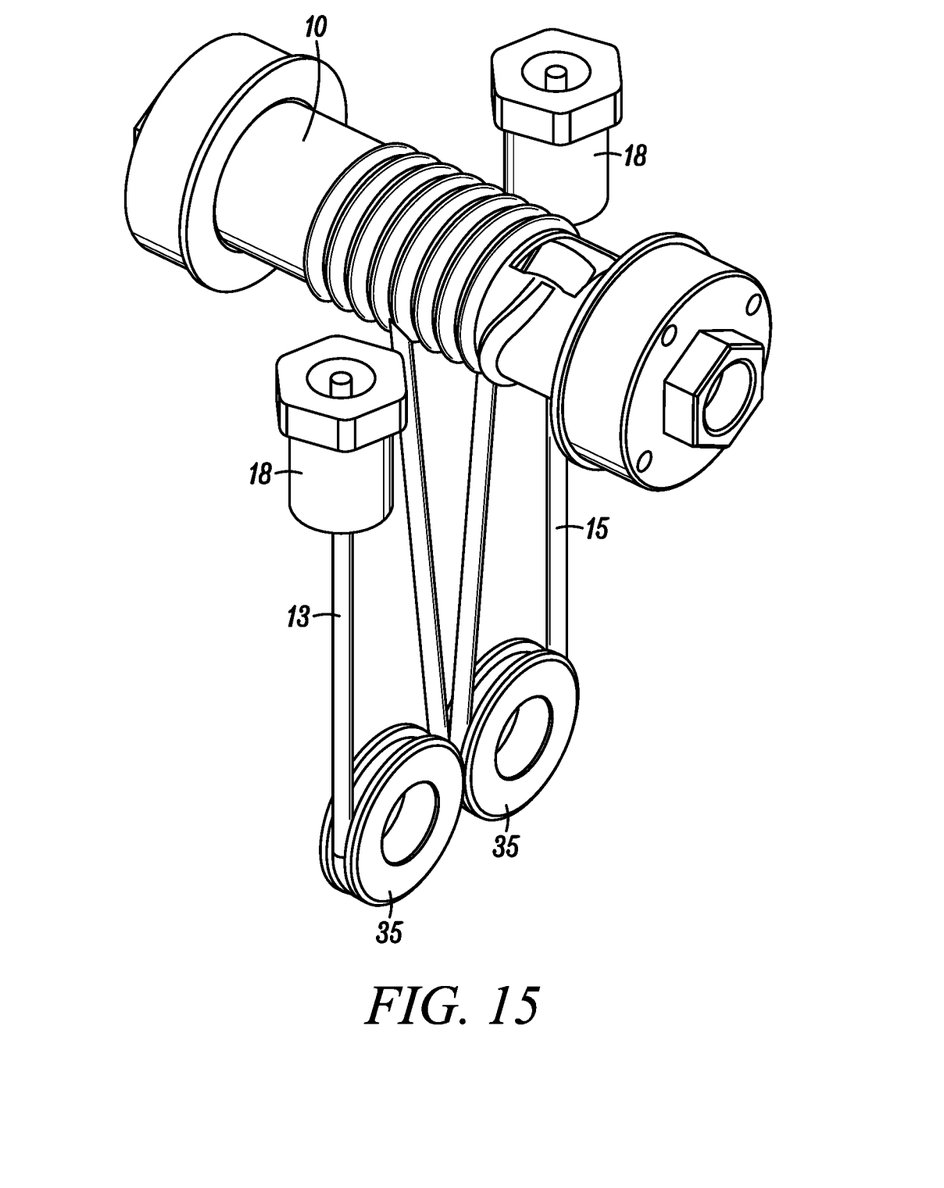
FIG. 15 shows the cable routing and power transmission of the linear and rotary motion converter shown in FIG. 7.

FIG. 15 shows the cable routing and power transmission. The cables [13,15] can be routed in any way that eventually brings them to the capstan spool where idler pulleys are placed at bends and all cables are tangent with idler pulleys and coincident with termination points. This configuration utilizes a single idler pulley [35] per cable run in order to package the system tightly. Additionally, the pulleys can assist in balancing the forces seen on the rolling diaphragm linear actuators themselves. This configuration ensures that the forces are always straight and have no fleet in the cable which leads to side loading.

FIG. 8 shows details of the static cable tensioning system illustrating a possible packaging of a static cable tensioning system. The cables [13,14,15,16] are attached to a screw [32] that has an external interface such as a hex driver head. The termination [17] from the cables [13,14,15,16] to the screw [32] is accomplished using an adhesive and/or a tapered hole. The screw [32] rides along a threaded nut [33]. The screw is held rotationally stationary with an allen driver tool while the nut is rotated by its flats. This causes the screw to travel vertically up and down along the nut, increasing or decreasing tension in the cable. This prevents the cable from rotating, which may damage the cable. In this embodiment, the nut is held and transfers power from the pistons to the tensioning system using a crossbeam [22].

The embodiment of the linear and rotary motion converter [4] shown in FIGS. 7, 8, 12 and 13 provides a number of advantages. For instance, the cable drive allows for flexible 3D packaging as the rolling diaphragm linear actuators can now be placed independently from each other in 3D space as long as a cable can be routed to connect them. In addition, the fixed capstan termination prevents "slipping" or "skipping" from high loads as there is a rigid termination and friction is not relied on for power transmission.

Figure 9:
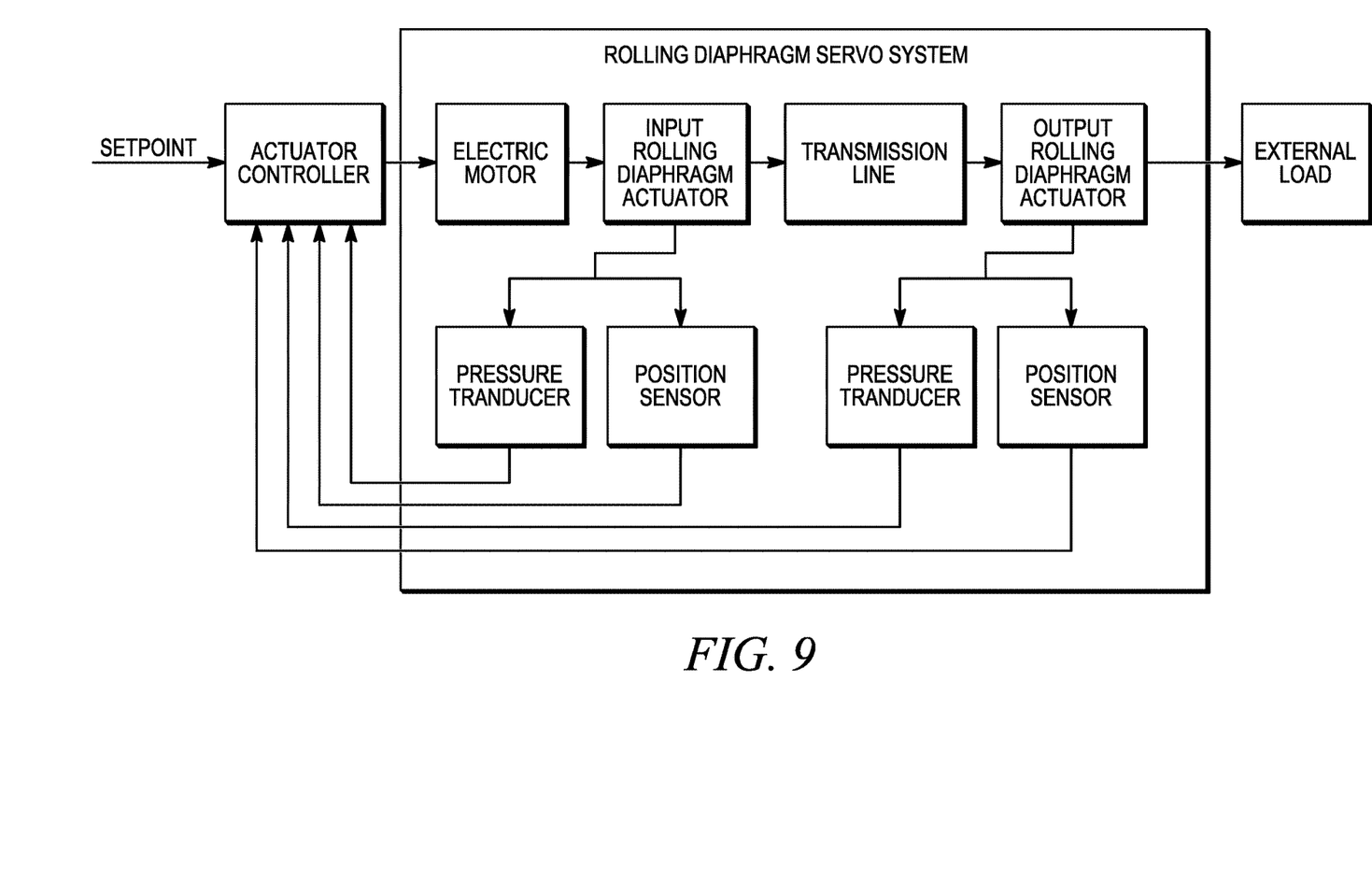
FIG. 9 shows a schematic block diagram of one example of a feedforward/feedback control for the hydraulic rolling diaphragm rotary actuator of FIG. 1.

FIG. 9 shows a schematic block diagram of one example of a feedforward/feedback control for the hydraulic rolling diaphragm rotary actuator [1]. Position, velocity and pressure sensors [5] may be used in several, potentially redundant locations on the actuators [12,3,4] (e.g. rotary position sensors may be placed on the rotary motion [8] shaft following the linear-rotary converter [4], rotary or linear position sensors may be placed within the linear-rotary converter [4] either on the rotary or linear components, or linear position sensors may be placed on the rolling diaphragm linear actuators [2,3] and transmission lines [6,7] (e.g. pressure sensors on the transmission lines or directly on the rolling diaphragm linear actuators illustrated within FIG. 1). Sensors may be placed on both on the input and output rolling diaphragm actuators to provide redundant pressure and position estimates and to improve understanding of the system state due to deviations between the systems caused by the transmission line.

The actuator controller may be a single or a hybrid any of the following several controller types: a model-less feedback controller (e.g. PID controller); a model based linear controller (which may include feedforward terms) or nonlinear model based controller (which may include feedforward terms). An observer may be used for state estimation.

The servo system may be configured as electro-hydrostatic transmission using a pair of rolling diaphragm rotary actuators [1] (described in Use Case 1) with an electric motor supplying rotary motion [8] and torque to one rolling diaphragm rotary actuator, where the other rolling diaphragm rotary actuator's output is the desired control variable. The electric motor generates or absorbs torques and may be direct drive or geared.

One advantage of the control device shown in FIG. 9 arises from the provision of feedback control on the input cylinder assembly with a feedforward term, which accounts for the inertia of fluid and output assembly for a rolling diaphragm rotary actuator using hydraulic-hydraulic or hydraulic pneumatic configuration using pressure and/or linear or rotary position feedback. In particular, this arrangement allows for more accurate output position, velocity, and/or force control and trajectory tracking with very low friction in contrast with other fluid-based actuators.

Another advantage arises from the use of feedback control on the output cylinder using pressure and/or position sensors to provide more precise position, velocity, and/or force control of the output load. This may be combined with feedforward control to account for inertia. This arrangement allows for more accurate output position, velocity, and/or force control and trajectory tracking with very low friction in contrast with other fluid based actuators. It also enables superior output error rejection and detection due to direct observation and removes latency due to hydraulic lines of several milliseconds up to tens of milliseconds depending on transmission line length. It also enables a loss of pressure detection.

Yet another advantage arises from the use of model-based control with an observer using input and output sensor feedback for the rolling diaphragm transmission for improved position, velocity, and/or force control of the output load. This may allow for more accurate output position, velocity, and/or force control and trajectory tracking with very low friction in contrast with other fluid-based actuators. It also provides superior performance versus model free methods and it enables error detection and correction.

The various illustrative embodiments of hydrostatic rolling diaphragm transmission enables transparent coupling of output and input rotary motion with high stiffness and minimal backlash, stiction, and hysteresis. These embodiments are also robust arrangements that can prevent liquid intrusion, thereby allowing usage in underwater environments (salt and fresh water) without additional sealing. They may also be constructed using non-ferrous materials, allowing usage in magnetically sensitive environments such as Magnetic Resonance Imagers, for instance.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

| Listing of Elements | |
|---|---|
| 1 | Rolling diaphragm Rotary Actuator |
| 2 | Rolling diaphragm Linear Actuator 1 |
| 3 | Rolling diaphragm Linear Actuator 2 |
| 4 | Linear-Rotary Converter |
| 5 | Sensors |
| 6 | Fluid Transmission Line 1 |
| 7 | Fluid Transmission Line 2 |
| 8 | Rotary Motion |
| 9 | Concentric Cable Capstan |
| 10 | Helical Cable Capstan |
| 11 | Rotary output shaft |
| 12 | Transmission inlet-outlet |
| 13 | Cable 1a |
| 14 | Cable 1b |
| 15 | Cable 2a |
| 16 | Cable 2b |
| 17 | Cable Termination |
| 18 | Cable Tensioner Unit |
| 19 | Rolling Diaphragm |
| 20 | Piston |
| 21 | Piston Rod |
| 22 | Cross member |
| 23 | Cable linear rigid body |
| 24 | Rotary Bearings |
| 25 | Structure/frame |
| 26 | Rolling Diaphragm Cylinder |
| 27 | Rigid body end plates |
| 28 | Rolling diaphragm cylinder housing |
| 29 | Pneumatic Supply Tank |
| 30 | Rolling diaphragm Linear Actuator 1 |
| 31 | Rolling diaphragm Linear Actuator 2 |
| 32 | Tension screw |
| 33 | Cable tension nut |
| 34 | Base |
| 35 | Idler Pulley |

The invention claimed is:

1. A linear to rotary motion converter, comprising:
a rigid body having first and second opposing end plates interconnected by at least one rigid crossmember, each of the end plates being operatively coupled to a rolling diaphragm linear actuator to thereby cause linear displacement of the rigid body in an axial direction upon actuation of the rolling diaphragm linear actuators;
a capstan operably coupled to the end plates such that linear motion of the rigid body caused by actuation of the rolling diaphragm linear actuators is translated to rotational motion of the capstan; and
a first pair of cables mechanically coupling a first of the end plates to the capstan and a second pair of cables mechanically coupling a second of the end plates to the capstan such that each of the cables move tangentially to a circumference of the capstan upon actuation of the rolling diaphragm linear actuators.

2. The linear to rotary motion converter of claim 1, wherein end portions of a first cable in the first pair of cables and a first cable in the second pair of cables are concentrically wrapped around the capstan.

3. The linear to rotary motion converter of claim 1, wherein end portions of a first cable in the first pair of cables and a first cable in the second pair of cables are helically wrapped around the capstan.

4. The linear to rotary motion converter of claim 1, wherein each of the cables in the first and second pairs extend in the axial direction.

5. The linear to rotary motion converter of claim 1, wherein (i) the first and second cables in the first pair are equidistant from a central axis along which the rolling diaphragm linear actuators are displaced and (ii) the first and second cables in the second pair of cables are equidistant from the central axis, the first cable in the first pair and the second cable in the first pair being located on opposing sides of the central axis and the first cable in the second pair and the second cable in the second pair being located on opposing sides of the central axis.

6. The linear to rotary motion converter of claim 5, wherein the first and second cables in the first pair are each a first distance from the central axis and the first and second cables in the second pair are each a second distance from the central axis different from the first distance.

7. The linear to rotary motion converter of claim 1, further comprising an adjustable tensioning arrangement for adjusting tension in the cables in the first and second pairs.

8. The linear to rotary motion converter of claim 7, wherein the adjustable tensioning arrangement includes at least one tensioning mechanism located on each of the end plates such that end portions of the first and second cables in the first pair terminate in a first of the end plates via at least one of the tensioning mechanisms and end portions of the first and second cables in the second pair terminate on the second of the end plates via at least another of the tensioning mechanisms.

9. The linear to rotary motion converter of claim 8, wherein each of the end portions of the first and second cables in the first pair terminate in the first end plate and each of the end portions of the first and second cables in the second pair terminate in the second end plate via a different tensioning mechanism such that tensioning of each of the cables is independently adjustable.

10. The linear to rotary motion converter of claim 1, wherein the crossmember is mechanically connected to the end plates under compression loading.

11. The linear to rotary motion converter of claim 1, wherein at least one of the rolling diaphragm linear actuators is a hydraulic rolling diaphragm linear actuator.

12. The linear to rotary motion converter of claim 1, wherein at least one of the rolling diaphragm linear actuators is a pneumatic rolling diaphragm linear actuator.

13. The linear to rotary motion converter of claim 1, wherein at least one of the rolling diaphragm linear actuators is a hydraulic rolling diaphragm linear actuator and another of the rolling diaphragm linear actuators is a pneumatic rolling diaphragm linear actuator.

14. The linear to rotary motion converter of claim 1, wherein the capstan is located between the end plates.

15. The linear to rotary motion converter of claim 1 wherein each rolling diaphragm linear actuator comprises two or more parallel cylinders and a piston pair directly coupled to each other.

16. A linear to rotary motion converter, comprising:
a rigid body having first and second opposing end plates interconnected by at least one rigid crossmember, each of the end plates being operatively coupled to a rolling diaphragm linear actuator to thereby cause linear displacement of the rigid body in an axial direction upon actuation of the rolling diaphragm linear actuators;
a capstan operably coupled to the end plates such that linear motion of the rigid body caused by actuation of the rolling diaphragm linear actuators is translated to rotational motion of the capstan, wherein at least one of the rolling diaphragm linear actuators is a hydraulic rolling diaphragm linear actuator and another of the rolling diaphragm linear actuators is a pneumatic rolling diaphragm linear actuator.

17. The linear to rotary motion converter of claim 16 wherein each rolling diaphragm linear actuator comprises two or more parallel cylinders and a piston pair directly coupled to each other.

* * * * *